US011692514B2

(12) United States Patent
Nakamura et al.

(10) Patent No.: US 11,692,514 B2
(45) Date of Patent: Jul. 4, 2023

(54) SCRAMJET ENGINE AND FLYING OBJECT

(71) Applicant: MITSUBISHI HEAVY INDUSTRIES, LTD., Tokyo (JP)

(72) Inventors: Masaharu Nakamura, Tokyo (JP); Akihiko Tsunemi, Tokyo (JP); Takuto Haniu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 16 days.

(21) Appl. No.: 16/638,203

(22) PCT Filed: Jul. 13, 2018

(86) PCT No.: PCT/JP2018/026500
§ 371 (c)(1),
(2) Date: Feb. 11, 2020

(87) PCT Pub. No.: WO2019/155654
PCT Pub. Date: Aug. 15, 2019

(65) Prior Publication Data
US 2020/0362795 A1    Nov. 19, 2020

(30) Foreign Application Priority Data
Feb. 9, 2018    (JP) .................... 2018-022332

(51) Int. Cl.
*F02K 7/14*    (2006.01)
(52) U.S. Cl.
CPC ............ *F02K 7/14* (2013.01); *F05D 2220/10* (2013.01); *F05D 2240/35* (2013.01)
(58) Field of Classification Search
CPC ........... F02K 7/14; F02K 7/10; F05D 2220/10
See application file for complete search history.

(56) References Cited

U.S. PATENT DOCUMENTS 2,952,123 A  *  9/1960  Rich .................... F02K 1/28
                                              60/231
5,058,826 A      10/1991 Coffinberry
                         (Continued)

FOREIGN PATENT DOCUMENTS

JP    2-201033     8/1990
JP    2-275051    11/1990
                (Continued)

OTHER PUBLICATIONS

Hanson "Applications of quantitative laser sensors to kinetics, propulsion and practical energy systems"; Proceedings of the Combustion Institute 33 (2011); pp. 1-40 (Year: 2011).*
(Continued)

*Primary Examiner* — Ted Kim
(74) *Attorney, Agent, or Firm* — Wenderoth, Lind & Ponack, L.L.P.

(57) ABSTRACT

A scramjet engine includes first and second flow path forming members and first and second fuel injection devices. A flow path formed between the first and second flow path forming members includes a turbulence forming region where compressed air is introduced and a combustion region located downstream thereof. The second flow path forming member is formed with a protrusion in the turbulence formation region. The first fuel injection device is configured to inject fuel into the compressed air via a first fuel nozzle. The second flow path forming member is formed with a cavity located in the combustion region. The second fuel injection device is configured to inject fuel into the compressed air via a second fuel nozzle. The cavity is provided with an inclined surface connected to a bottom surface. An inclination of the inclined surface is adjusted so that a shock wave is generated in the combustion region.

15 Claims, 4 Drawing Sheets

(56) References Cited

U.S. PATENT DOCUMENTS

| | | | | |
|---|---|---|---|---|
| 5,072,581 | A | * | 12/1991 | Harshman .................. F02K 7/10 60/768 |
| 5,072,582 | A | | 12/1991 | Harshman |
| 5,085,048 | A | | 2/1992 | Kutschenreuter, Jr. et al. |
| 5,109,670 | A | | 5/1992 | Harshman |
| 5,202,525 | A | | 4/1993 | Coffinberry |
| 5,253,474 | A | | 10/1993 | Correa et al. |
| 5,791,148 | A | * | 8/1998 | Burrus ................... F02C 7/224 60/749 |
| 6,216,644 | B1 | | 4/2001 | Eroglu et al. |
| 6,286,298 | B1 | * | 9/2001 | Burrus ..................... F23R 3/50 60/750 |
| 2003/0154720 | A1 | | 8/2003 | Boehnlein et al. |
| 2008/0060361 | A1 | * | 3/2008 | Morrison .................. F02K 7/10 60/768 |
| 2008/0196414 | A1 | * | 8/2008 | Andreadis ............... F01D 9/065 60/746 |
| 2015/0013305 | A1 | * | 1/2015 | Trefny ..................... F23R 3/42 60/205 |
| 2019/0017706 | A1 | | 1/2019 | Hirokane et al. |
| 2019/0032602 | A1 | | 1/2019 | Hirokane et al. |

FOREIGN PATENT DOCUMENTS

| | | | | |
|---|---|---|---|---|
| JP | | 4-219452 | | 8/1992 |
| JP | | 8-334213 | | 12/1996 |
| JP | | 2000-146184 | | 5/2000 |
| JP | | 2004-84516 | | 3/2004 |
| JP | | 2005-517862 | | 6/2005 |
| JP | | 2012-013007 | | 1/2012 |
| JP | | 2012-13008 | | 1/2012 |
| JP | | 2012-202226 | | 10/2012 |
| JP | | 2012-207555 | | 10/2012 |
| JP | | 2016-056692 | | 4/2016 |
| JP | | 2016-138725 | | 8/2016 |
| JP | | 2017-160873 | | 9/2017 |
| JP | | 2017-166409 | | 9/2017 |
| JP | | 2017-166410 | | 9/2017 |
| JP | | 2017-180109 | | 10/2017 |
| KR | 10-2009-0055412 | | | 6/2009 |
| KR | | 20110072150 | * | 6/2011 ............... F02K 7/14 |

OTHER PUBLICATIONS

Freeborn "Swept-Leading-Edge Pylon Effects on a Scramjet Pylon-Cavity Flameholder Flowfield" Journal of Propulsion and Power; vol. 25, No. 3, May-Jun. 2009 , pp. 571-582. (Year: 2009).*

Li et al "Plasma-assisted ignition for a kerosene fueled scramjet at Mach 1.8", Aerospace Science and Technology, vol. 28, Issue 1, 2013, pp. 72-78 (Year: 2013).*

Pan et al "Experimental investigation of combustion mechanisms of kerosene-fueled scramjet engines with double-cavity flameholders", Acta Meeh. Sin. (2011) 27(6):891-897 DOI 10.1007/s10409-011-0470-8 (Year: 2011).*

Kuhn et al "Ceramic Strut Injection Technologies for High-Speed Flight" 21st AIAA International Space Planes and Hypersonics Technologies ConferenceAt: Xiamen, China vol. AIAA-2017-2416, Mar. 2017, pp. 1-11 (Year: 2017).*

English translation of the International Preliminary Report on Patentability and Written Opinion of the International Searching Authority dated Aug. 20, 2020 in International (PCT) Application No. PCT/JP2018/026500.

International Search Report dated Sep. 25, 2018 in International (PCT) Application No. PCT/JP2018/026500.

Extended European Search Report dated Jun. 19, 2020 in corresponding European Patent Application No. 18905558.5.

Notice of Reasons for Refusal dated Jun. 16, 2021 in Japanese Patent Application No. 2018-022332, with English Translation.

* cited by examiner

SCRAMJET ENGINE AND FLYING OBJECT

CROSS-REFERENCE TO RELATED APPLICATION

The present application claims priority based on Japanese Patent Application No. 2018-022332 filed on Feb. 9, 2018 and all disclosure thereof is herein incorporated by reference.

TECHNICAL FIELD

The present invention relates to a scramjet engine and a flying object.

BACKGROUND ART

A scramjet engine is considered as a propulsion device for a flying object that flies at supersonic speed. A scramjet engine is configured to obtain a thrust by: taking in and compressing with ram pressure supersonic air to generate compressed air; injecting fuel into the relevant compressed air to burn the fuel; and exhausting combustion gas of high temperature and high pressure generated by the burning.

In order to obtain enough propulsion of a scramjet engine, it is desired to improve combustion efficiency of the injected fuel.

It should be noted that Japanese Patent Publication No. 2012-202226 discloses a scramjet engine with a variable fuel injection direction. This publication discloses a technology of injecting fuel from a ramp provided to a wall surface into airflow and a technology of injecting fuel from upstream of a cavity into airflow.

In addition, Japanese Patent Publication No. 2004-84516 discloses a technology of providing a protrusion object with acute angle facing the rear on an engine inner wall and directing a recirculation flow from the rear to the rear by this protrusion object.

CITATION LIST

Patent Literature
[Patent Literature 1] Japanese Patent Publication No. 2012-202226 A
[Patent Literature 2] Japanese Patent Publication No. 2004-84516 A

SUMMARY OF INVENTION

An objective of the present invention is to improve combustion efficiency of a scramjet engine. Other objectives and new features of the present invention will be understood by skilled persons in the art from following descriptions.

From a point of view of the present invention, a scramjet engine is provided with a first flow path forming member, a second flow path forming member provided in opposite to the first flow path forming member, a first fuel injection device and a second fuel injection device. A flow path is formed between the first flow path forming member and the second flow path forming member. The flow path includes a turbulence formation region where a compressed air is introduced from upstream and a combustion region that is located downstream of the turbulence formation region and where a combustion using the compressed air is carried out. The second flow path forming member is formed with a protrusion located in the turbulence formation region and protruding toward the first flow path forming member. The first fuel injection device is configured to inject fuel into the compressed air via a first fuel nozzle provided to the protrusion. The second flow path forming member is formed with a cavity located in the combustion region. The second fuel injection device is configured to inject fuel into the compressed air via a second fuel nozzle provided to the cavity. The cavity is provided with a bottom surface and an inclined surface connected to a downstream side end of the bottom surface. An inclination of the inclined surface of the cavity is adjusted so that a shock wave is generated in the combustion region.

In an embodiment, the flow path may be further provided with an upstream region configured to introduce the compressed air to the turbulence forming region. In this case, an adjustment is carried out so that an angle between the inclined surface of the cavity and a first surface that is a surface of a part of the second flow path forming member facing the upstream region is less than or equal to 45 degrees.

It is preferable that the angle between the inclined surface of the cavity and the first surface of the second flow path forming member is larger than or equal to 20 degrees.

In an embodiment, the second fuel injection device injects fuel from a location downstream of a discontinuity surface generated by a generation of the shock wave to a location upstream of the relevant discontinuity surface so that the fuel crosses the discontinuity surface.

In an embodiment, the second flow path forming member is provided with a second surface located downstream of the protrusion of the turbulence forming region and a distance between the second surface and the first flow path forming member is larger than a distance between the first surface and the first flow path forming member.

In an embodiment, a top end of a front wall of the cavity is connected to the second surface and an upstream side end of the bottom surface of the cavity is connected to a bottom end of the front wall.

In an embodiment, the scramjet engine is further provided with a third fuel injection device configured to inject fuel to the second flow path forming member via a third fuel nozzle provided to the first flow path forming member at a location downstream to the cavity.

The above described scramjet engine may be provided to a flying object and used.

According to the present invention, a combustion efficiency of a scramjet engine can be improved.

DESCRIPTION OF EMBODIMENTS

Figure 1:
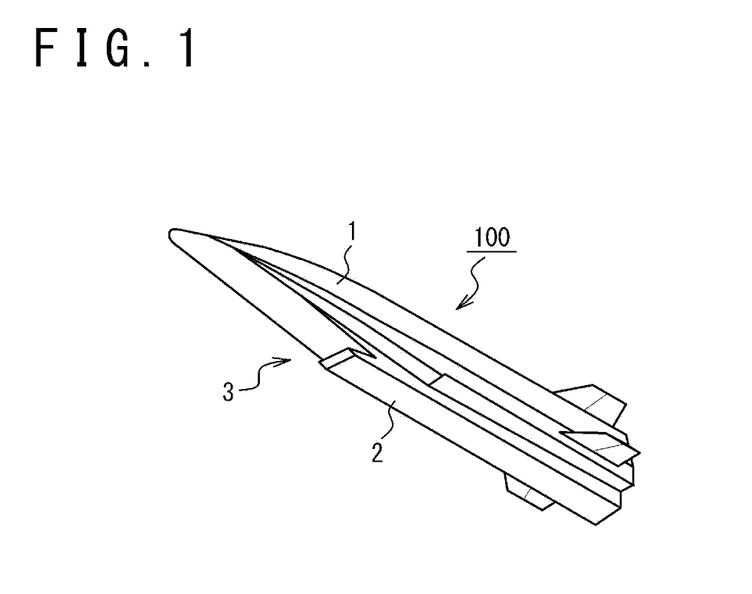
FIG. 1 is a perspective view showing a configuration of a flying object according to an embodiment.

FIG. 1 is a perspective view showing a configuration of a flying object 100 according to an embodiment. A fuselage 1 of the flying object 100 is provided with a cowl 2 and various members and equipment constituting a scramjet engine 3 are provided to the fuselage 1 and the cowl 2.

Figure 2:
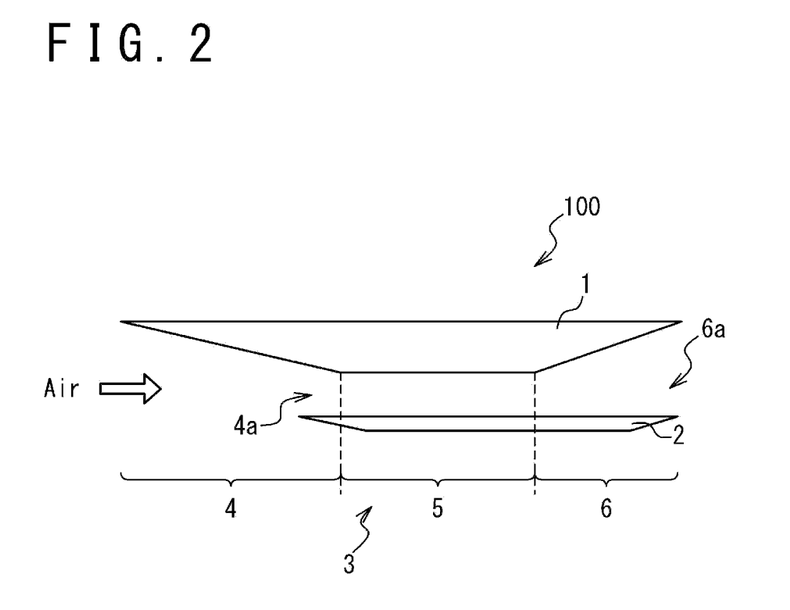
FIG. 2 is a schematic diagram showing a configuration of a scramjet engine according to an embodiment.

As shown in FIG. 2, the scramjet engine 3 is schematically provided with an inlet section 4, a combustor 5 and a nozzle section 6. The inlet section 4 take in supersonic air from a front opening 4a, compresses the air that is taken in and generates compressed air. The combustor 5 receives the compressed air from the inlet section 4, combusts fuel by use of the relevant compressed air and generates combustion gas. The nozzle section 6 exhausts the combustion gas generated in the combustor 5 from a rear opening 6a. Propulsion of the flying object 100 can be obtained by exhausting combustion gas from the rear opening 6a.

Figure 3:
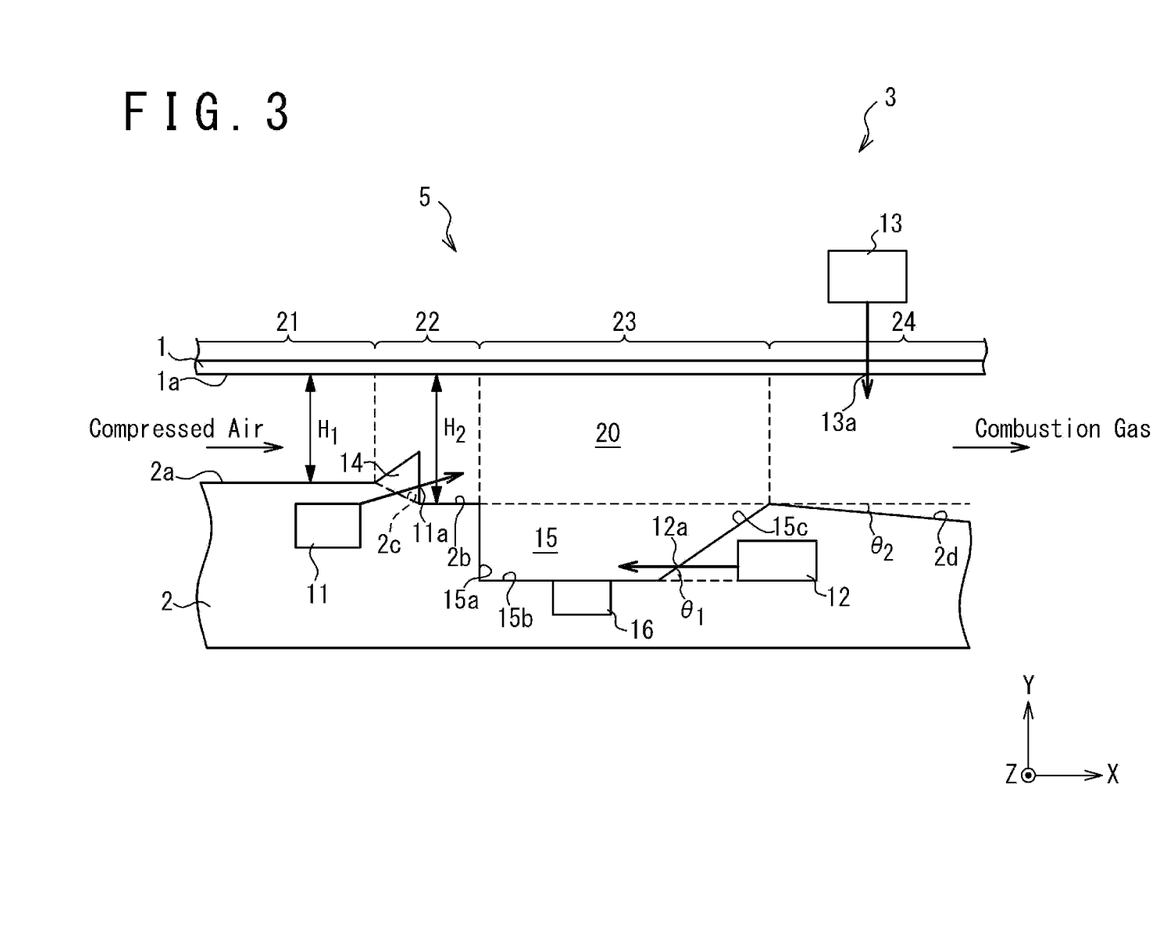
FIG. 3 is a cross sectional view showing a configuration of a combustor according to an embodiment.

FIG. 3 is a cross sectional view showing a configuration of a combustor 5. It should be noted that in the following description an XYZ Cartesian coordinate system will be introduced and directions may be expressed by use of the relevant XYZ Cartesian coordinate system.

The combustor 5 is provided with fuel injection devices 11, 12 provided to the cowl 2 and a fuel injection device 13 provided to the fuselage 1, and is configured to inject fuel by the fuel injection devices 11, 12, 13 into the compressed air received from the inlet section 4 and combust the fuel.

In the present embodiment, a space between the fuselage 1 and the cowl 2 is used as a flow path 20 of the combustor 5. That is, the fuselage 1 and the cowl 2 are used as flow path forming members that form the flow path 20. The flow path 20 of the combustor 5 includes an upstream region 21, a turbulence forming region 22, a combustion region and a downstream region 24.

The upstream region 21 is formed between a surface 1a of the fuselage 1 and a surface 2a (a first surface) of the cowl 2 and introduces the compressed air generated in the inlet section 4 to the turbulence forming region 22. In the present embodiment, the surface 2a is located at the uppermost stream of the combustor 5 and regulates a direction of a flow of the compressed air and the combustion gas in the whole combustor 5. In the present embodiment, the direction of the flow of the compressed air and the combustion gas in the whole combustor 5 is +X direction and the surface 1a of the fuselage 1 and the surface 2a of the cowl 2 are parallel to XZ plane. A height of the flow path in the upstream region 21, that is, a distance between the surface 1a of the fuselage 1 and the surface 2a of the cowl 2, is $H_1$.

Figure 4:
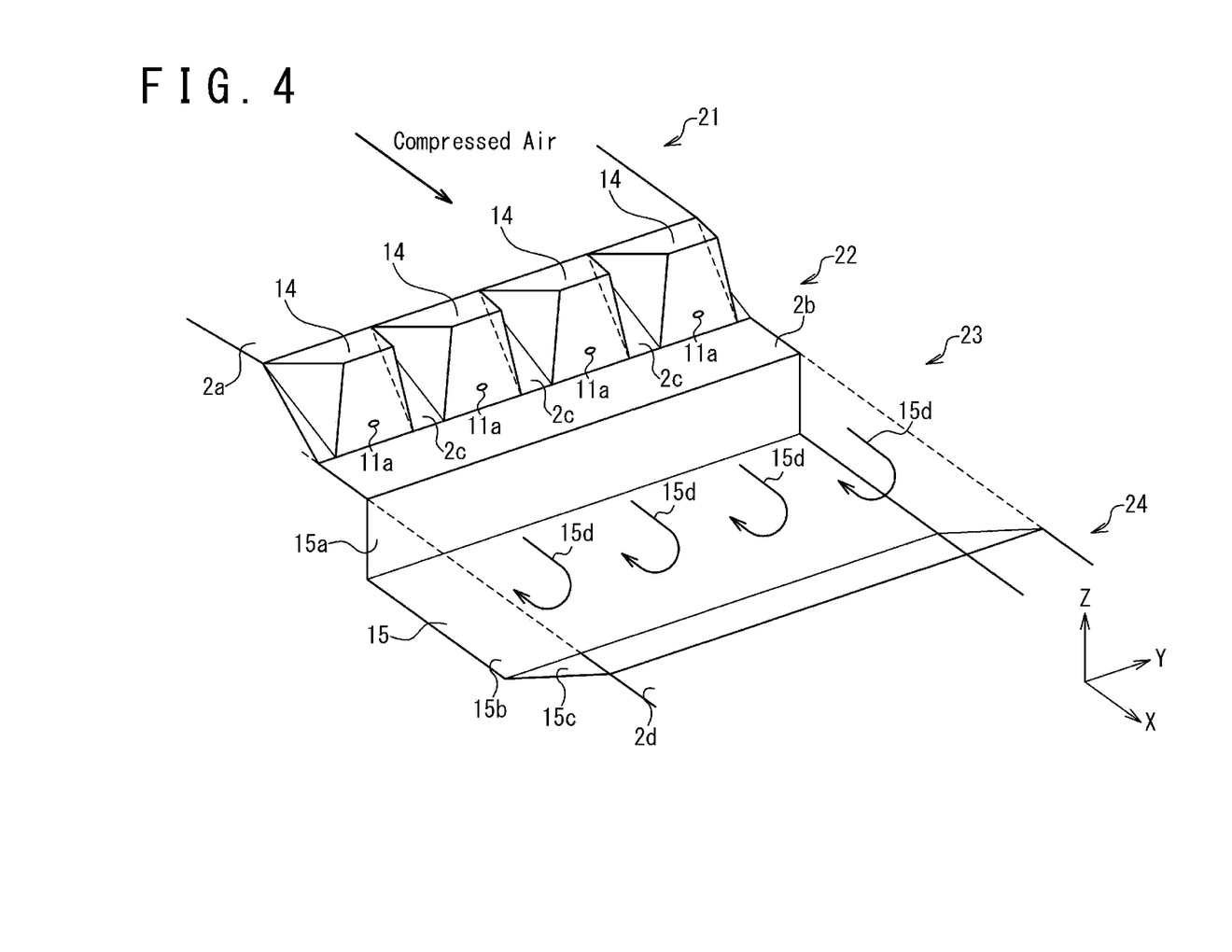
FIG. 4 is a perspective view showing a configuration of a combustor shown in FIG. 3.

The turbulence forming region 22 is located downstream of the upstream region 21. A protrusion 14 protruding toward the surface 1a of the fuselage 1 is formed in a part of the cowl 2 facing the turbulence forming region 22. As shown in FIG. 4, a plurality of protrusions 14 are arranged along a direction of crossing the flow path 20, that is, in Y axis direction. The protrusions 14 form turbulence in downstream thereof. As described below, the turbulence formed downstream of the protrusions 14 contributes to improvement of combustion efficiency.

Fuel nozzles 11a are formed in protrusions 14 and the fuel injection device 11 injects fuel from the fuel nozzles 11a to downstream of the protrusions 14. As a result, the fuel is injected into a turbulence generated by the protrusions 14.

By referring again to FIG. 3, the surface 2b (second surface) of the cowl 2 is connected to a downstream side end of the protrusion 14. In the present embodiment, the surface 2b is in parallel with XZ plane. A height of the flow path 20 at the surface 2b of the cowl 2, that is, a distance between the surface 1a of the fuselage 1 and the surface 2b of the cowl 2, is $H_2$. The height $H_2$ of the flow path at the surface 2b located downstream of the protrusions 14 is higher than the height $H_1$ of the flow path 20 at the surface 2a located upstream of the protrusions 14. As shown in FIG. 4, the surface 2a located upstream of the protrusions 14 and the surface 2b located downstream of the protrusions 14 are connected by surfaces 2c of the cowl 2 formed between adjacent protrusions 14.

As shown in FIG. 3, the combustion region 23 is located downstream of the turbulence forming region 22 and in the combustion region 23 an air-fuel mixture that is formed is ignited and the air-fuel mixture is combusted. It should be noted that the combustion region 23 means a region where the combustion is mainly carried out but does not mean that combustion does not occur in any other region. For example, combustion may occur in a part of the downstream region 24 too.

A cavity 15 is formed in a part of the cowl 2 facing the combustion region 23 for flame holding. The cavity 15 is formed to be recessed from the surface 2b located downstream of the protrusions 14 and has a front wall 15a, a bottom surface 15b and an inclined surface 15c. In the present embodiment, a top end of the front wall 15a is located adjacent to the turbulence forming region 22 and is connected to a downstream side end of the surface 2b. In the present embodiment, the front wall 15a is perpendicular to the surface 2b (that is, parallel to YZ plane). The bottom surface 15b is connected to a bottom end of the front wall 15a. In the present embodiment, the bottom surface 15b of the cavity 15 is parallel to the surface 2a of the cowl 2 facing the upstream region 21 (that is, parallel to XZ plane).

The inclined surface 15c of the cavity 15 is connected to a downstream side end of the bottom surface 15b. The inclined surface 15c of the cavity 15 is inclined so that an angle between the inclined surface 15c and the surface 2a is angle $\theta_1$ (that is, an angle between the inclined surface 15c and XZ plane is angle $\theta_1$). The angle $\theta_1$ may be called cavity ramp angle. In the present embodiment, since the bottom surface 15b of the cavity 15 is parallel to the surface 2a, as a result, the inclined surface 15c is inclined so that an angle between the inclined surface 15c and the bottom surface 15b is angle $\theta_1$.

Fuel nozzles 12a are formed at inclined surfaces 15c of the cavity 15 and the fuel injection devices 12 inject fuel from fuel nozzles 12a to inside the cavity 15. Furthermore, an ignition device 16 that ignites fuel injected to the cavity 15 is provided at the bottom surface 15b of the cavity 15.

The downstream region 24 is located downstream of the combustion region 23. The downstream region 24 feeds the combustion gas generated by combustion in the combustor 5 into the nozzle section 6.

A fuel nozzle 13a is provided at a part of the surface 1a of the fuselage 1 facing the downstream region 24 and the fuel injection device 13 injects fuel from the fuel nozzle 13a to the downstream region 24. The fuel injection device 13 is provided in order to block a flow of the combustion gas by injecting fuel in the downstream region 24 and thereby promoting combustion.

In the downstream region 24, in at least apart thereof, a cross-sectional area of the flow path 20 may increase toward the downstream. Such configuration contributes to flow the combustion gas downstream along the cowl 2 smoothly in the downstream region 24. The scramjet engine 3 according to the present embodiment becomes unable to take in air when the flow of the combustion gas is excessively blocked by injection of fuel by the fuel injection device 13 because an upstream pressure becomes excessively high. By increasing the cross-sectional area of the flow path 20 in the downstream region 24 toward the downstream, a space can be kept in order to flow the combustion gas downstream along the cowl 2 and smoothly exhaust the combustion gas.

Specifically, in the present embodiment, an opening angle is set to the cowl 2 in the downstream region 24. That is, the surface 2d of the cowl 2 facing the downstream region 24 is inclined so that a distance between the surface 1a of the fuselage 1 and the surface 2d of the cowl 2 increase toward downstream. In FIG. 3, an angle between the surface 1a of the fuselage 1 and the surface 2d of the cowl is shown by a symbol $\theta_2$. As a result, the cross-sectional area of the flow path 20 increases toward downstream and this is effective for smoothly exhausting combustion gas. In the present embodiment, the angle $\theta_2$ may be set larger than or equal to 2 degrees and less than or equal to 4 degrees.

Figure 5:
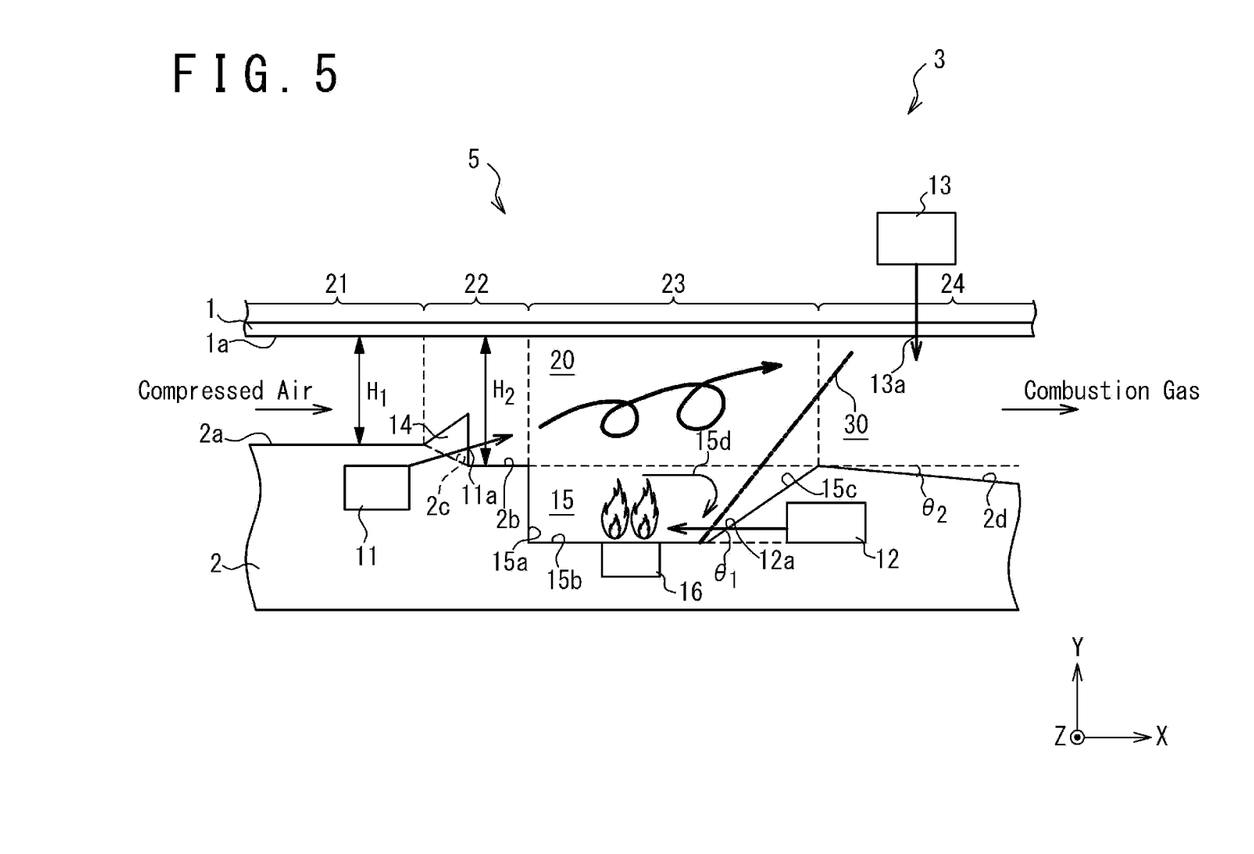
FIG. 5 is a cross sectional view showing an operation of a combustor according to an embodiment.

FIG. 5 is a diagram showing an operation of the combustor 5 according to the present embodiment.

In the combustor 5 according to the present embodiment, the inclination of the inclined surface 15c of the cavity 15 is adjusted so that a shock wave is generate in the combustion region 23, and as a result a combustion efficiency is improved. Herein, it should be noted that a generation of a shock wave means that a pressure discontinuity surface 30 is generated. In the present embodiment, the discontinuity surface 30 is oblique to the flow of combustion gas, that is, an oblique shock wave is generated.

The cavity 15 is a structure configured to form a circulation flow inside by slowing a flow of an air-fuel mixture and realize flame holding by igniting this circulation flow. From such a point of view, it is common to set a relatively large value to the cavity ramp angle, that is, the angle $\theta_1$ between the inclined surface 15c and the surface 2a of the cowl 2, in order to slow enough the flow of the air-fuel mixture.

The inventor discovered that when an inclination of the inclined surface 15c of the cavity 15 is gentle, that is, when the angle $\theta_1$ between the inclined surface 15c and the surface 2a of the cowl 2 is smaller, an action of slowing a flow inside the cavity 15 is weaker, rather the combustion is promoted by generation of a shock wave. When a shock wave is generated in the combustion region 23, a pressure discontinuity surface 30 is formed in the combustion region 23. In a vicinity region in upstream side of the discontinuity surface 30, pressure and temperature increase and by carrying out combustion in such a region, combustion efficiency can be effectively improved.

The inventor confirmed by simulation that setting of the angle $\theta_1$ between the inclined surface 15c of the cavity 15 and the surface 2a of the cowl 2 to be less than or equal to 45 degrees is suitable for generation of shock wave. Furthermore, the inventor confirmed by combustion experiment that combustion efficiency can be improved of approximatively 30% by adjusting inclination of the inclined surface 15c so as to generate shock wave. It should be noted that the reason why inclination of the inclined surface 15c is expressed relative to the surface 2a of the cowl 2 is because the surface 2a of the cowl 2 determines the direction of flow of the compressed air and the combustion gas in whole the combustor 5.

On the other hand, when an inclination of the inclined surface 15c of the cavity 15 is excessively gentle, function of slowing the flow is lost. From such a point of view, it is preferable that the angle $\theta_1$ between the inclined surface 15c of the cavity 15 and the surface 2a of the cowl 2 is larger than or equal to 20 degrees.

In the following, details of operation of combustor 5 according to the present embodiment will be described.

The compressed air generated by the inlet section 4 flows into the upstream region 21 and further is introduced to the turbulence forming region 22.

When the compressed air is introduced in the turbulence forming region 22, turbulence is generated downstream of the protrusions 14 by row of protrusions 14 formed in the turbulence forming region 22. Furthermore, fuel is injected from the fuel nozzles 11a provided to the protrusions 14 to the turbulence generated downstream of the protrusions 14, and as a result, the air-fuel mixture is generated. Injecting fuel into turbulence is effective for efficiently generating air-fuel mixture.

The structure of the turbulence forming region 22 of the combustor 5 according to the present embodiment further improves efficiency of forming air-fuel mixture. In the present embodiment, the height $H_2$ of the flow path 20 at the surface 2b located downstream of the protrusions 14 is higher than the height $H_1$ of the flow path 20 at the surface 2a located upstream of the protrusions 14, and the pressure at a part that faces the surface 2b of the turbulence forming region 22 becomes lower than in the upstream region 21. In addition, as shown in FIG. 4, the surface 2a located upstream of the protrusions 14 and the surface 2b located downstream of the protrusions 14 are connected by the surfaces 2c of the cowl 2 formed between adjacent protrusions 14, and a flow of compressed air is formed between adjacent protrusions 14 and along the surfaces 2c. As a result, forming of turbulence is promoted and air-fuel mixture in that fuel and compressed air are mixed is efficiently generated.

The air-fuel mixture generated in the turbulence forming region 22 is introduced to the combustion region 23. A part of the air-fuel mixture is decelerated by the cavity 15 and as a result a circulation flow 15d is formed in the cavity 15. By injecting fuel by the fuel injection device 12 from the fuel nozzle 12a to the circulation flow 15d and further by igniting the circulation flow 15d by the ignition device 16, flame is hold in the cavity 15.

Furthermore, the air-fuel mixture introduced to the combustion region 23 is ignited by the flame hold in the cavity 15, the air-fuel mixture burns and the combustion gas is generated.

As described above, shock wave is generated in the combustion region 23 because of a gentle formation of the inclined surface 15c of the cavity 15, and as a result a pressure discontinuity surface 30 is formed in the combustion region 23. In a vicinity region upstream of the discontinuity surface 30, high combustion efficiency is obtained because pressure and temperature increase.

The discontinuity surface 30 reaches inside the cavity 15, and the fuel injection device 12 injects fuel from a location downstream of the discontinuity surface 30 to a location upstream of the discontinuity surface 30 so that the fuel crosses the discontinuity surface 30. This is effective to promote mixing of circulation flow 15d generated inside the cavity 15 and the fuel and to improve combustion efficiency.

The combustion gas generated in the combustion region 23 is introduced to the downstream region 24. In the downstream region 24, the flow of the combustion gas flown from the combustion region 23 is blocked by the fuel injection of the fuel injection device 13 and a speed of the combustion gas is decreased. As a result, combustion of unburned fuel included in the combustion gas can be promoted. The combustion gas is introduced from the downstream region 24 to the nozzle section 6 and exhausted from the nozzle section 6. As a result, propulsion to propel the flying object 100 can be obtained.

As described above, the scramjet engine 3 according to the present embodiment can improve combustion efficiency of combustion gas by generating shock wave in the combustion region 23.

Although embodiments of the present invention are described in detail in the above, the present invention is not limited to the above embodiments. A person skilled in the art would understand that the present invention may be carried out with various modifications.

For example, although in the above described embodiment it is described that the fuel injection device 13 is provided to the fuselage 1 and the fuel injection devices 11, 12, the protrusions 14, the cavity 15 and the ignition device 16 are on the cowl 2, the present invention is not limited to this. The components that are described in the above described embodiment to be provided to the cowl 2 may be provided to the fuselage 1 and the components that are described to be provided to the fuselage 1 may be provided to the cowl 2.

In addition, if enough combustion efficiency can be obtained, the fuel injection device 13 that injects fuel into the downstream region 24 may be omitted.

The invention claimed is:

1. A scramjet engine comprising:
a first flow path forming member;
a second flow path forming member provided opposite to the first flow path forming member;
a first fuel injection device; and
a second fuel injection device,
wherein a flow path is formed between the first flow path forming member and the second flow path forming member,
wherein the flow path includes:
a turbulence formation region to which compressed air is introduced from upstream; and
a combustion region that is located downstream of the turbulence formation region and where combustion using the compressed air is carried out,
wherein the second flow path forming member comprises at least one protrusion located in the turbulence formation region, the at least one protrusion protruding toward the first flow path forming member,
wherein the first fuel injection device is configured to inject first fuel into the compressed air via a first fuel nozzle provided on the at least one protrusion,
wherein the second flow path forming member is formed with a cavity located in the combustion region,
wherein the second fuel injection device is configured to inject second fuel into the compressed air via a second fuel nozzle provided to the cavity,
wherein the cavity comprises:
a bottom surface; and
an inclined surface connected to a downstream side end of the bottom surface,
wherein an inclination of the inclined surface of the cavity is configured to be adjusted such that a shock wave is generated in the combustion region to generate a discontinuity surface that reaches inside the cavity, and
wherein the second fuel nozzle is configured to inject the second fuel from a location proximate the bottom surface of the cavity and downstream of the discontinuity surface such that: (i) the second fuel is injected with an upstream axial component into an upstream flowing portion of cavity recirculation flow; and (ii) the second fuel crosses the discontinuity surface in the cavity to join the cavity recirculation flow.

2. The scramjet engine according to claim 1,
wherein the flow path further comprises an upstream region configured to introduce the compressed air to the turbulence formation region,
wherein the second flow path forming member further comprises a first surface that faces the upstream region, and
wherein an angle between the inclined surface of the cavity and the first surface is less than or equal to 45 degrees.

3. The scramjet engine according to claim 2, wherein the angle between the inclined surface of the cavity and the first surface is larger than or equal to 20 degrees.

4. The scramjet engine according to claim 2,
wherein the second flow path forming member further comprises a second surface located downstream of the at least one protrusion, and
wherein a distance between the second surface and the first flow path forming member is larger than a distance between the first surface and the first flow path forming member.

5. The scramjet engine according to claim 4,
wherein a top end of a front wall of the cavity is connected to the second surface, and
wherein an upstream side end of the bottom surface of the cavity is connected to a bottom end of the front wall of the cavity.

6. The scramjet engine according to claim 1, further comprising a third fuel injection device configured to inject third fuel toward the second flow path forming member via a third fuel nozzle provided to the first flow path forming member at a location downstream of the cavity.

7. A flying object comprising the scramjet engine according to claim 1.

8. The scramjet engine according to claim 1,
wherein the flow path further comprises an upstream region configured to introduce the compressed air to the turbulence formation region,
wherein the second flow path forming member further comprises:
a first surface that faces the upstream region; and
a second surface located downstream of the at least one protrusion,
wherein a distance between the second surface and the first flow path forming member is larger than a distance between the first surface and the first flow path forming member,
wherein the at least one protrusion is in contact with a downstream end of the first surface and an upstream end of the second surface, and
wherein a width of the at least one protrusion at the upstream end of the second surface is narrower than a width of the at least one protrusion at the downstream end of the first surface.

9. The scramjet engine according to claim 1, wherein the at least one protrusion comprises a plurality of protrusions arranged in a direction crossing the flow path.

10. The scramjet engine according to claim 9,
wherein the flow path further comprises an upstream region configured to introduce the compressed air to the turbulence formation region,
wherein the plurality of protrusions comprises a first protrusion and a second protrusion,
wherein the second flow path forming member further comprises:
a first surface that faces the upstream region,
a second surface located downstream of the plurality of protrusions; and a third surface located between the first protrusion and the second protrusion to connect the first surface and the second surface, wherein a distance between the second surface and the first flow path forming member is larger than a distance between the first surface and the first flow path forming member, and wherein the first protrusion and the second protrusion protrude from the third surface toward the first flow path forming member.

11. The scramjet engine according to claim 10, wherein a width of the third surface increases toward downstream of the flow path.

12. The scramjet engine according to claim 1, wherein the flow path further comprises an upstream region configured to introduce the compressed air to the turbulence formation region, wherein the second flow path forming member further comprises:
 a first surface that faces the upstream region; and
 a second surface located downstream of the at least one protrusion, wherein the at least one protrusion is located in the turbulence formation region so as to be in contact with a downstream end of the first surface, wherein the at least one protrusion has a face that faces downstream, wherein the face of the at least one protrusion comprises:
 a first edge; and
 a second edge located farther from the first flow path forming member than the first edge, wherein a length of the first edge of the face of the at least one protrusion is shorter than a width of the at least one protrusion at the downstream end of the first surface, and wherein the length of the first edge of the face of the at least one protrusion is shorter than a length of the second edge of the face of the at least one protrusion.

13. The scramjet engine according to claim 12, wherein a first distance between the first edge of the face of the at least one protrusion and the first flow path forming member is shorter than a second distance between the first surface and the first flow path forming member, and wherein the second distance is shorter than a third distance between the second edge of the face of the at least one protrusion and the first flow path forming member.

14. The scramjet engine according to claim 12, wherein the length of the second edge of the face of the at least one protrusion is shorter than the width of the at least one protrusion at the downstream end of the first surface.

15. The scramjet engine according to claim 12, wherein the face of the at least one protrusion has a trapezoidal shape.

* * * * *